Nov. 13, 1928.

J. F. BAKER 1,691,369

FURNACE

Filed July 14, 1927

INVENTOR
John F. Baker
BY
ATTORNEY

Patented Nov. 13, 1928.

1,691,369

UNITED STATES PATENT OFFICE.

JOHN F. BAKER, OF MANSFIELD, OHIO, ASSIGNOR TO WESTINGHOUSE ELECTRIC & MANUFACTURING COMPANY, A CORPORATION OF PENNSYLVANIA.

FURNACE.

Application filed July 14, 1927. Serial No. 205,557.

My invention relates to furnaces and more particularly to electrically heated annealing furnaces.

In annealing furnaces, it is a common practice to employ a structure of the "bell" type wherein the roof and side walls may be raised, as a unit, out of engagement with the hearth portion, thereby facilitating the placing of material to be annealed upon the hearth and the subsequent removal therefrom.

Another type of furnace in common use is the "elevator" type wherein the furnace walls and roof remain stationary and the hearth is moved vertically into engagement therewith.

In both types of furnace, difficulty has been experienced in providing an effective seal between the furnace-chamber walls and the hearth portion to prevent infiltration of outside air to the furnace-chamber and resultant oxidizing of the work.

It is an object of my invention, therefore, to provide, in furnaces of the above-mentioned type, a seal between the edges of the hearth and adjacent furnace side walls which effectively prevents the passage of air into the furnace.

A further object of my invention is to provide an improved seal between the hearth and walls of a furnace chamber having means for artificially cooling portions of the seal to protect the sealing material from the effects of the furnace temperature thereon.

In practicing my invention, I provide an annealing furnace of the "bell" type wherein the furnace roof and walls may be raised, as a unit, out of engagement with the hearth portion, and means between the hearth and side walls adapted to effect a seal therebetween. Means are also provided to artificially cool the sealing means to minimize the deleterious effect thereupon of heat from the furnace chamber.

Figure 1:
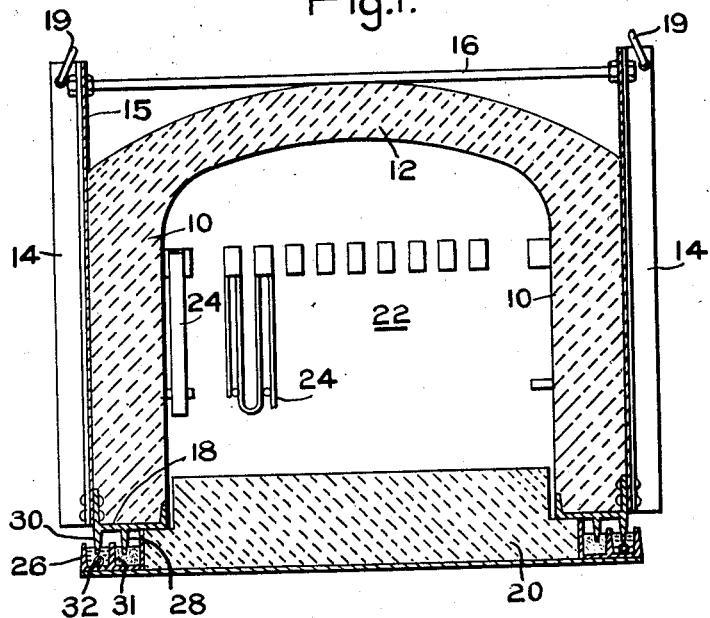
Figure 2:
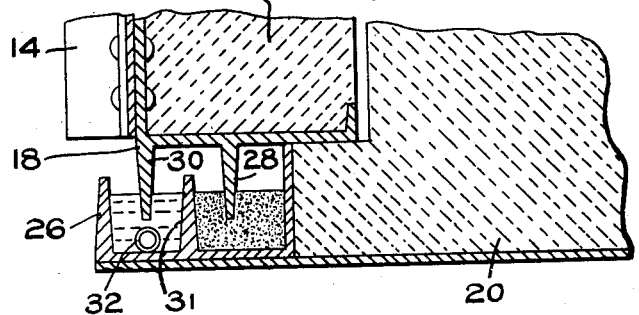
Figure 3:
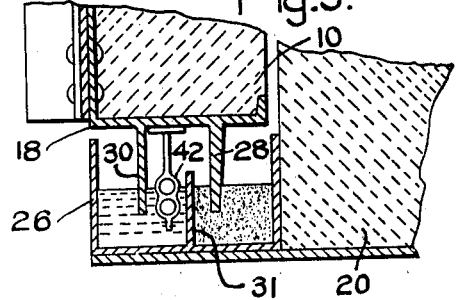

In the drawing, Figure 1 is a view, in vertical lateral section, of a furnace embodying my invention;

Fig. 2 is a view, in section, of a portion of a furnace having the sealing means shown in Fig. 1, portions of the furnace wall and hearth being broken away; and Fig. 3 is a view, similar to Fig. 2, of a modified form of my invention.

Referring more particularly to Fig. 1, an annealing furnace embodying my invention comprises refractory heat-insulating side walls 10 and roof 12, maintained in operative relation by a frame work of angle irons 14 and a metal shell 15, extending vertically along the outer faces of the walls 10 and tied together, adjacent to the upper ends thereof, by rods 16 extending laterally of the furnace structure. Secured to the lower ends of the angle irons 14, and projecting laterally therefrom, are angle members 18 which engage the under faces of the walls 10 in supporting relation.

The furnace body, thus formed, is adapted to be raised and lowered, as a unit, by suitable means (not shown) engaging links 19 secured to the upper extremities of the angle irons 14.

A stationary hearth 20, substantially coextensive in area with the area defined by the side walls 10, is adapted to cooperate therewith to form a heating chamber 22 in which the annealing operation takes place.

The chamber 22 is heated, in the present embodiment, by a sinuous electrical resistance element 24 supported upon the inner faces of side walls 10, in the usual manner, and electrically connected to a suitable source of electrical energy, (not shown).

A seal, as contemplated by my invention, is formed between the lower edges of the side walls 10 and the hearth 20, and comprises channel sections 26 supported upon the peripheral edge of the hearth substantially in alignment with the walls 10. The channel sections are adapted to receive depending flanges 28, 30, formed on the angles 18, when the hearth and the furnace body are in operative positions.

As shown more clearly in Fig. 2, a flange 31, formed on the channel sections 26, is adapted to be positioned between the depending flanges 28 and 30 to divide the channel sections into two substantially equal divisions longitudinally thereof.

A quantity of granular refractory material partially fills the half of the channel adjacent to the heating chamber and cooperates with the depending flange 28 to form a sand seal of the usual type.

The half of the channel remote from the furnace chamber contains a liquid, water in the present embodiment, which cooperates with the depending flange 30 to form a liquid seal.

A combined sand and liquid seal is thereby provided which prevents, to a large extent, the loss of heat between the hearth and the side walls, and substantially prevents the leakage of air into, and the efflux of gases out of, the furnace chamber.

A conduit 32, positioned within the liquid-containing portion of channel 26 and extends substantially the entire length thereof, provides a passage for a suitable cooling fluid. The temperature of the sealing liquid is thereby lowered, and evaporation thereof is reduced to a minimum.

In the modified construction shown in Fig. 3, the artificial cooling of the seal is effected by means of a pipe coil 42 depending from, and supported by, the face of angle member 18. The operation and effect of this construction is similar to that pointed out above.

In operation, the furnace body is raised by suitable means engaging the links 19, and the material to be annealed is placed upon the hearth. The furnace body is then lowered upon the hearth, with the depending flanges 28 and 30, buried in the sand and liquid, respectively, in channel 26. The heating elements are then energized, and cooling fluid is circulated through the conduit 32, or, as in Fig. 3, through the cooling coil 42.

During the subsequent heating and cooling of the furnace, the sealing means effectively prevents the efflux of furnace-chamber gases and the influx of air therethrough, and, at the same time, reduces the thermal losses to a minimum.

By invention, I have provided a combined sand and liquid seal for an annealing furnace which is effective in operation and rugged in construction.

While I have shown a particular furnace structure, my invention is obviously applicable to furnaces of all types wherein there is a relative vertical movement between the hearth and the furnace-chamber walls. Also, it is clearly immaterial whether the furnace is heated electrically, as shown, or by other common and well-known methods.

Modifications may be made in my invention without departing from the spirit and scope thereof and I desire, therefore, that only such limitations shall be placed thereon as are imposed by the prior art and set forth in the appended claims.

I claim as my invention:

1. In a furnace, the combination with a hearth, a plurality of furnace walls and means permitting a relative vertical movement therebetween, of means for providing liquid and sand seals between said hearth and walls in the operative positions thereof, and means for artificially cooling said seals to prevent the evaporation of liquid from said sealing means.

2. In a furnace, the combination with a hearth, a plurality of furnace walls and means permitting a relative vertical movement therebetween, of means for providing liquid and sand seals between said hearth and walls, said means comprising a pair of juxtaposed channels carried by said hearth substantially in alignment with said walls, a quantity of granular refractory material in one of said channels and a liquid material in the other, and means carried by said walls to be received in said granular and liquid materials.

3. In a furnace, the combination with a hearth, a plurality of furnace walls and means permitting a relative vertical movement therebetween, of means for providing liquid and sand seals between said hearth and walls, said means comprising a pair of juxtaposed channels carried by said hearth substantially in alignment with said walls, a quantity of granular refractory material in one of said channels and a liquid material in the other, and means carried by and depending from said walls to be received in said granular and liquid materials, said last mentioned means comprising a pair of flanges on the under face of said walls coextensive in length with said granular and liquid-receiving channels, respectively.

4. In a furnace, the combination with a hearth, a plurality of furnace walls and means permitting a relative vertical movement therebetween, of means for providing liquid and sand seals between said hearth and walls, said means comprising a pair of juxtaposed channels carried by said hearth substantially in alignment with said walls, a quantity of granular refractory material in one of said channels and a liquid material in the other, means carried by, and depending from, said walls to be received in said granular and liquid materials, and means for artificially cooling said seal to prevent the evaporation of said liquid material.

5. In a furnace, the combination with a hearth, a plurality of furnace walls and means permitting a relative vertical movement therebetween, of means for providing liquid and sand seals between said hearth and walls, said means comprising a pair of juxtaposed channels carried by said hearth substantially in alignment with said walls, a quantity of granular refractory material in one of said channels and a liquid material in the other, means carried by, and depending from, said walls to be received in said granular and liquid materials, and means for passing a cooling fluid through said seal to effect the artificial cooling thereof.

6. In a furnace, the combination with a hearth, a plurality of furnace walls and means permitting a relative vertical movement therebetween, of means for providing liquid and sand seals between said hearth and walls in the operative position thereof, and means for artificially cooling said seal to prevent the evaporation of said liquid sealing means, said means comprising means positioned adjacent said liquid sealing means forming a conduit for the passage of a cooling fluid.

7. In a furnace, the combination with a heating chamber and a hearth therefor, of means forming a seal between said hearth and chamber side walls, said means comprising a channel formed in said hearth and a partition extending longitudinally of said channel, flanges formed on said side walls to depend into said channel on each side of said partition, means in said channel to prevent the passage of heat and gas therethrough; and means for artificially cooling said seal.

8. In a furnace, the combination with a heating chamber and a hearth therefor, of means forming a seal between said hearth and chamber side walls, said means comprising a channel formed in said hearth and a partition extending longitudinally of said channel, flanges formed on said side walls to depend into said channel on each side of said partition, a cooling coil supported from the under face of said side walls and adapted to be received in said channel during the operation of the furnace, and means in said channel disposed for cooperation with said flanges to prevent the passage of heat and gas therethrough.

In testimony whereof, I have hereunto subscribed my name this 30 day of June, 1927.

JOHN F. BAKER.